United States Patent [19]

Nishijima et al.

[11] Patent Number: 4,494,056
[45] Date of Patent: Jan. 15, 1985

[54] MOTOR DRIVING CIRCUIT

[75] Inventors: Hideo Nishijima; Katsumi Sera; Isao Fukushima; Yasunori Kobori, all of Katsuta, Japan

[73] Assignees: Hitachi, Ltd.; Hitachi Microcomputer Engineering, Ltd., both of Tokyo, Japan

[21] Appl. No.: 480,372

[22] Filed: Mar. 30, 1983

[30] Foreign Application Priority Data

Mar. 31, 1982 [JP] Japan ................... 57-51345

[51] Int. Cl.³ ............................ H02P 3/20
[52] U.S. Cl. .................... 318/269; 318/270; 318/271; 318/375; 318/341; 318/345
[58] Field of Search ........... 318/269, 270, 271, 375, 318/757, 758, 759, 760, 341, 380, 762, 379, 376, 373, 369, 378, 56, 60, 63, 245, 255, 257, 258, 261, 341, 345

[56] References Cited

U.S. PATENT DOCUMENTS

| | | | |
|---|---|---|---|
| 3,792,329 | 2/1974 | Kuhnlein | 318/373 X |
| 3,895,277 | 7/1975 | Klumpp | 318/269 |
| 3,916,276 | 10/1975 | Ottoson | 318/269 |
| 4,051,417 | 9/1977 | Fujinawa et al. | 318/341 X |
| 4,275,340 | 6/1981 | Schleupen | 318/256 X |
| 4,295,170 | 10/1981 | Weiszbrod | 360/74.1 X |
| 4,353,023 | 10/1982 | Kawada et al. | 318/762 |

Primary Examiner—Stanley J. Witkowski
Assistant Examiner—Paul Shik Luen Ip
Attorney, Agent, or Firm—Antonelli, Terry & Wands

[57] ABSTRACT

A motor driving circuit in which the opposite ends of the motor driving coils of a video tape recorder (VTR) capstan motor are shorted by a group of switching elements when a control input voltage generated from a rotation detection/oscillator is in a predetermined range.

12 Claims, 11 Drawing Figures

MOTOR DRIVING CIRCUIT

The present invention relates to a motor driving circuit and particularly to a circuit for driving a capstan motor provided with a braking function for use in a video tape recorder (VTR).

An example of the conventional driving circuit for a three phase motor is shown in FIG. 1. In the drawing, the reference numeral 1 denotes a rotation position detector for detecting the rotation position of a magnet mounted on a rotor 5 of a three-phase motor by using a conventional contactless sensor such as a Hall element, 2 denotes a signal generator responsive to an output of the rotation position detector 1 for generating a signal for changing over motor driving coils 4, 3 denotes a current amplifier for supplying the motor driving coils 4 with a current, 6 denotes an oscillator for generating a signal having a frequency corresponding to the rotation speed of the rotor 5, 7 denotes a frequency-to-voltage converter for producing a voltage corresponding to the frequency of the output signal of the oscillator 6, and 8 denotes a control amplifier for controlling the current flowing in the motor driving coils 4 in accordance with the output voltage of the frequency-to-voltage converter 7. The oscillator 6, the frequency-to-voltage converter 7 and the control amplifier 8 constitute a speed control loop. The signal generator 2 has a known three-phase driving current generating circuit as shown in FIG. 3. U.S. Pat. No. 4,338,554 to Fukushima et al. discloses a frequency-voltage comparator used in such a motor driving circuit.

Generally, in such a motor driving circuit, the relation between the input voltage $e_i$ and the motor driving current $I_M$ of the combination of the control amplifier 8 and the current amplifier 3 in the conventional open loop system has been as shown in FIG. 2. The value of voltage from which the motor current $I_M$ begins to flow is determined depending on a reference voltage $V_1$ as shown in FIG. 1. The trial to positively decelerate the rotation speed of the motor has not been considered in the arrangement of FIG. 2, while the applied voltage $e_i$ was set below the reference voltage $V_1$ so as to expect only the natural deceleration of the motor due to the rotation load and frictional resistance thereof. The running speed of a tape in the VTR is determined depending on the desired reproducing picture image speed, and the more the number of values of this desired reproducing picture image speed are set, the more the number of changing-over of the speed increases.

In such a conventional motor driving circuit, there has been a disadvantage that in the case where the rotation speed is changed over, particularly when the speed is changed from high to low speed, it takes a very long time for the deceleration due to the inertia moment inherently provided in the motor, resulting in a poor response.

To improve this disadvantage, it is considered to provide an opposite phase control means for decelerating the motor speed by reversing the direction of the current flowing in the motor driving coils. In this method, however, it is necessary to shorten the reverse signal application period in order to avoid the problem that if the reverse signal application period is long the motor begins to actually reversely rotate, so that a rapid braking effect can not be expected. Further, there is a problem that the maximum current flowing through the switching element is the sum of the currents determined in accordance with the source voltage and the counter electromotive force respectively, resulting in the requirement of a larger capacity for the switching element so as to be able to withstand against a larger current.

An object of the present invention is to eliminate the above-mentioned disadvantages in the prior art.

Another object of the present invention is to provide a motor driving circuit having a braking effect to speed up the change over of the motor speed from high to low speed (including the stopping mode).

To attain the above-mentioned objects, according to the present invention, braking means is provided in a motor driving stage for providing a braking effect to the counter electromotive force induced in the motor coil by shorting the opposite ends of the motor coil and the above-mentioned braking effect is actuated when the speed control input-voltage is in a predetermined voltage range so as to speed up the response in decelerating control.

Figure 5:
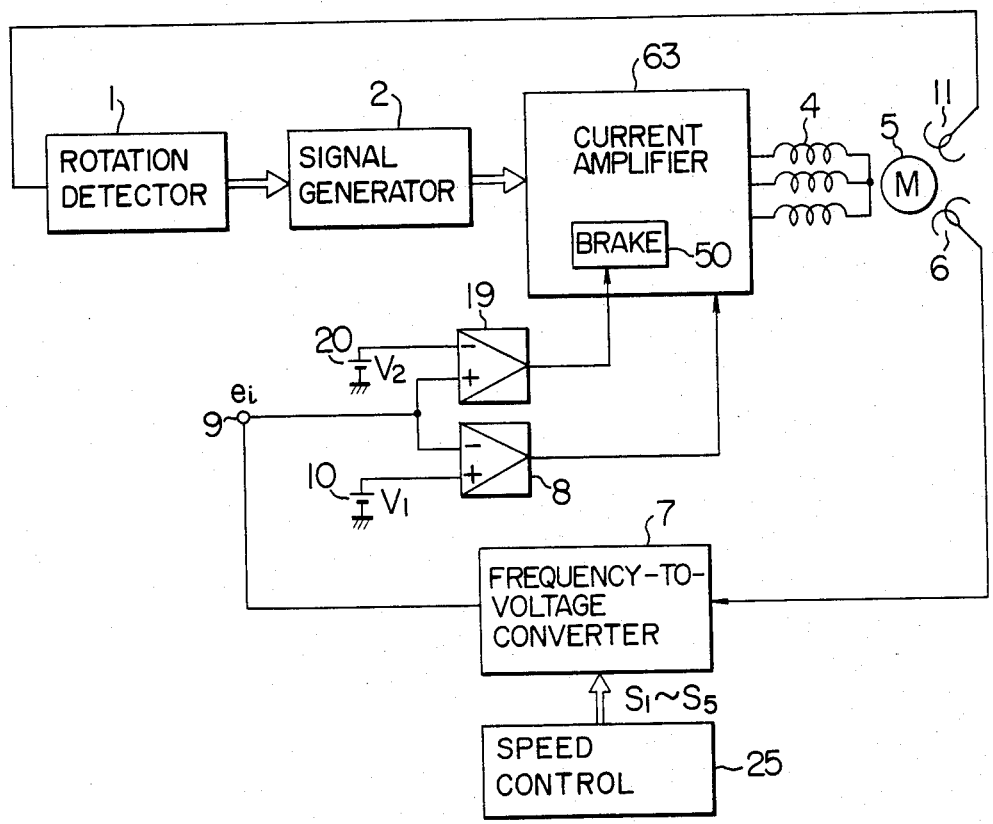
FIG. 5 is a block diagram showing an embodiment of the present invention.
Figure 6:
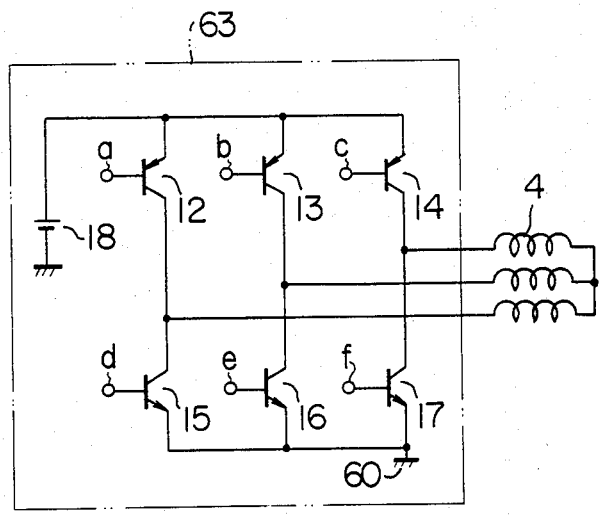
FIG. 6 is a circuit diagram showing in detail the block 63 in FIG. 5.
Figure 7:
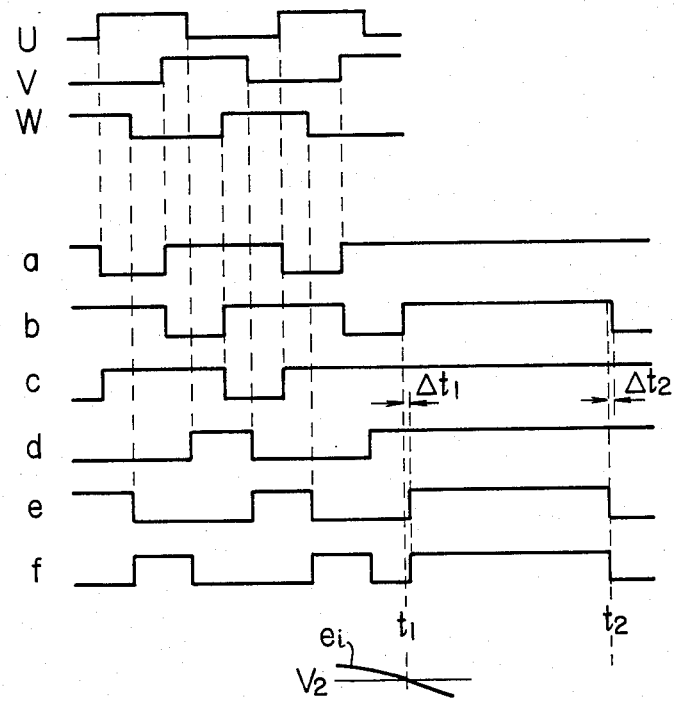
FIG. 7 shows waveforms of signals at main portions in FIG. 6.

Referring to FIGS. 5 to 7, the principle of the present invention will be described.

Figure 1:
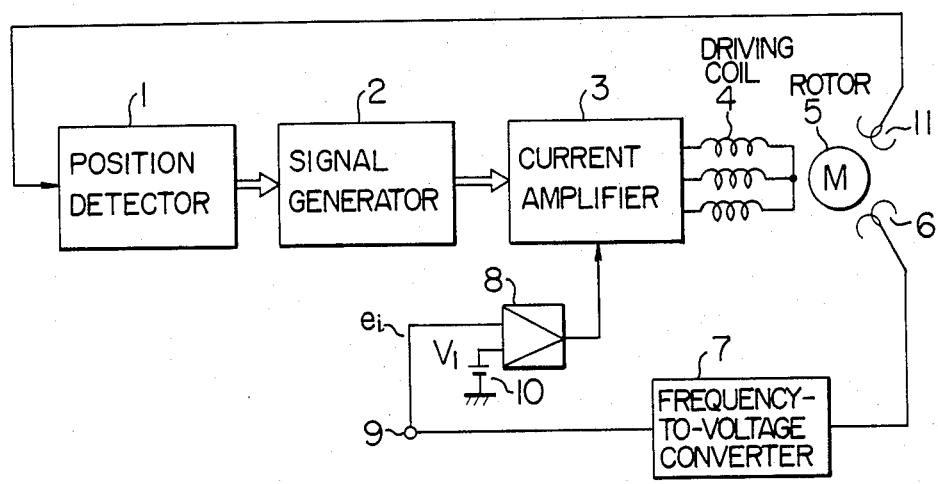
FIG. 1 is a block diagram showing an example of the conventional three-phase motor driving circuit.
Figure 2:
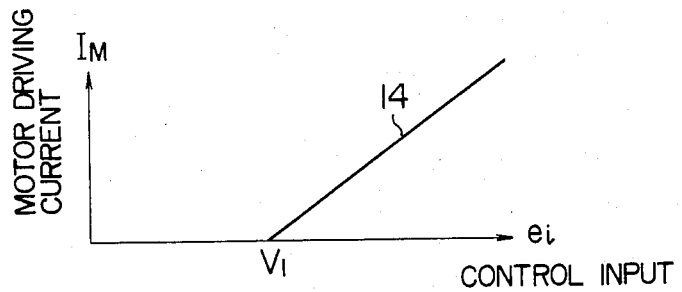
FIG. 2 is a graph showing the characteristic of the control input-voltage v.s. the output current to the motor driving coils 4.

FIG. 6 shows in detail a driving amplifier 63 constituting the three phase motor control circuit shown in FIG. 5. In FIG. 5, the parts having the same function as those in FIG. 1 are designated by the same reference numerals. Reference numerals 12-17 designate switching elements including the PNP transistors 12-14 and the NPN transistors 15-17 for supplying motor driving coils 4 with a current. The circuit is further provided with a source voltage 18 and an earth voltage 60. FIG. 7 shows by way of example the waveforms of the base input signals for the transistors 12-17. In this embodiment of the driving circuit, one of the PNP transistors 12-14 and one of the NPN transistors 15-17 are selectively made conductive to successively supply the motor driving coils 4 one after one with a current to cause the rotor (including a rotor magnet) to rotate. The technique is known well and the description with respect therefor will be omitted.

According to the present invention, a method of shorting the counter electromotive force induced in the motor driving coils 4 is employed to obtain a braking effect. In this method, since the counter electromotive force is produced due to the rotation of the motor, the braking effect can be obtained during the rotation of the motor. For this, in the method according to the present invention, there does not occur the above-mentioned disadvantage which is caused in the opposite phase braking method. Further, since the current which flows at this time is not large enough to cause the motor to rotate, it is not required to make the capacity of switching elements greater. The motor driving coil 4 inherently has its resistance value in actuality so as to effectively restrict the current caused to flow by the shorting to thereby prevent the coil and transistors from being damaged by an overcurrent.

The shorting may be performed by making conductive all the NPN transistors 15–17, while maintaining all the PNP transistors 12–14 off, for example, from the time $t_1$ as shown in FIG. 7. At this time, depending on the state of counter electromotive force, at least one of the transistors 15–17 is made to be such a mode that a current flows from its emitter to collector, that is a mode in which a current flows in the direction opposite to that of a normal collector current, to thereby make a path for the shorting current. Alternatively, it will be appreciated that the same effect can be obtained by making conductive all the PNP transistors 12–14, while keeping all the NPN transistors 15–17 off.

Figure 3:
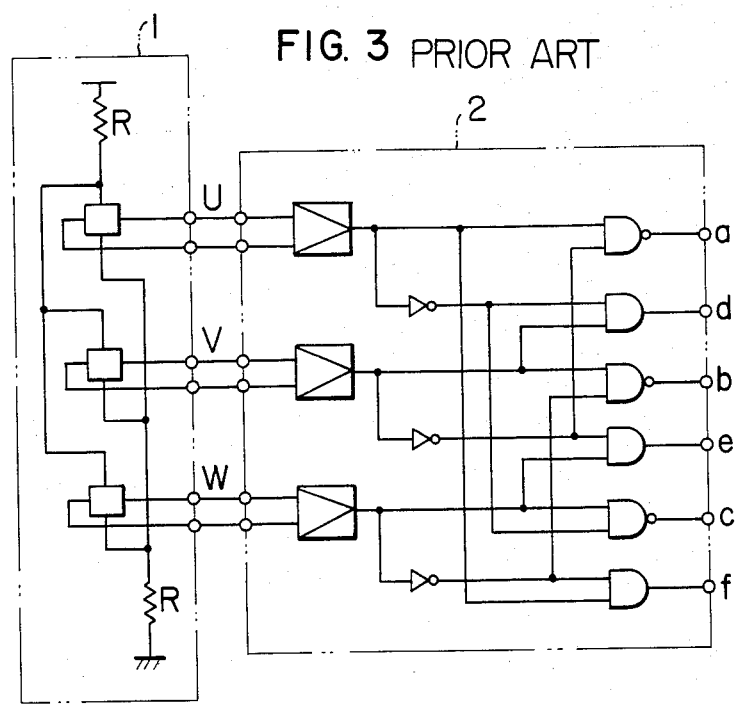
FIG. 3 is a block diagram showing in detail the blocks 1 and 2 in FIG. 1.
Figure 8:
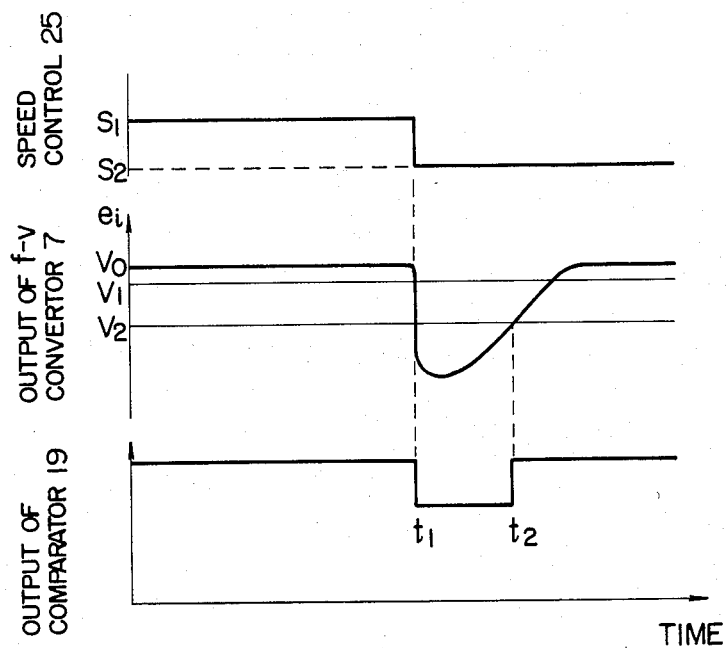
FIG. 8 shows waveforms illustrating the braking operation according to the present invention.
Figure 9:
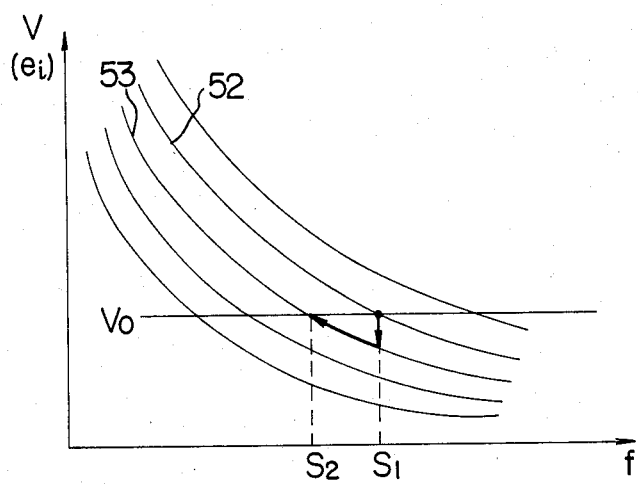
FIG. 9 is a graph showing the characteristic of the frequency-to-voltage converter.
Figure 10:
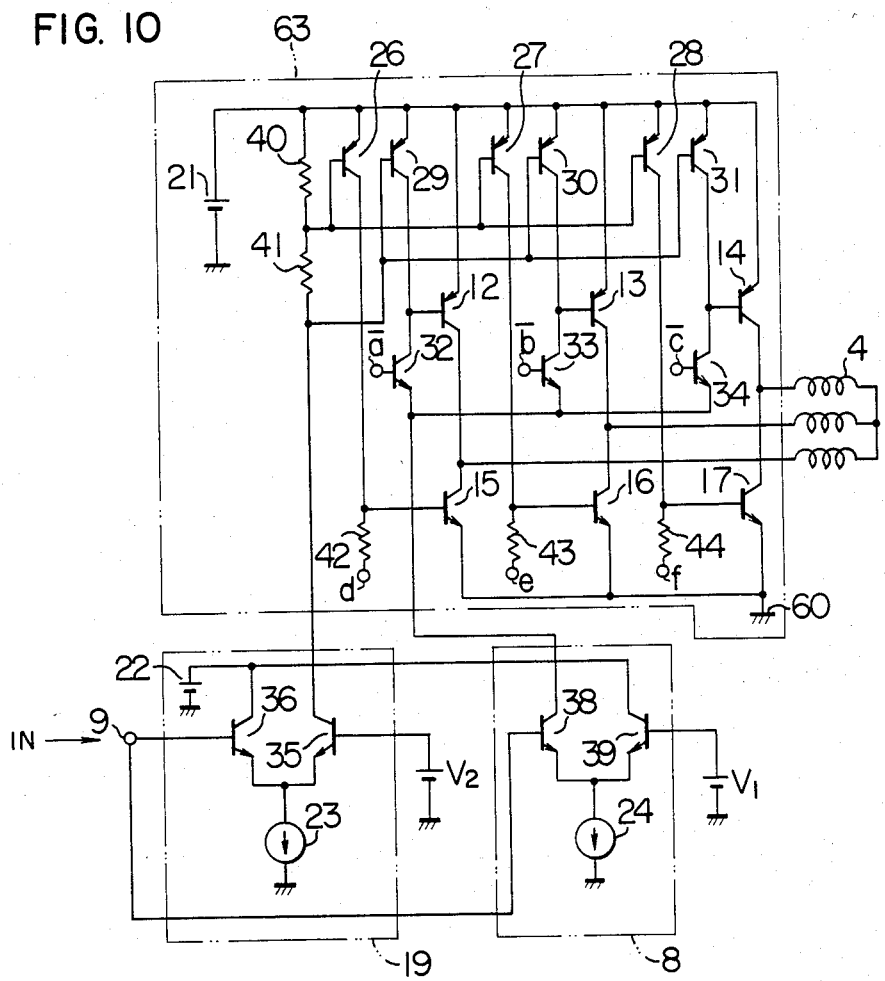
FIG. 10 is a circuit diagram showing an embodiment of the present invention.

Next, referring to FIGS. 7–9, a control circuit for providing the period to produce a control signal for this braking operation in FIG. 5 will be described. In FIG. 5, the same reference numerals as those used in FIGS. 1 and 3 denote the parts having the same functions as those shown in FIGS. 1 and 3. The reference numerals 19 and 20 denote a voltage comparator and a reference voltage source, respectively. When a predetermined speed $S_1$ of rotation is set, a voltage $V_0$ which is a little larger than a reference voltage $V_1$ of a reference voltage source 10 is applied to a control input-voltage terminal 9 and the torque produced in the motor may be controlled, for example, by changing a source voltage 18 in response to an output of a control amplifier 8. When the rotation speed of the motor is changed over from high to low speed, a speed control circuit 25 as shown in FIG. 5 commands a second speed $S_2$ and the operation state shifts from the curve 52 to the curve 53 in the frequency v.s. voltage characteristics of the frequency-to-voltage converter 7, as shown in FIG. 9. That is, the output $e_i$ of the frequency-to-voltage converter 7 decreases as indicated by a downward arrow in FIG. 8. At the time $t_1$ at which the value $e_i$ downwardly exceeds beyond the voltage $V_1$ of the reference voltage source 10, the supply of current to the motor driving coils 4 is stopped by making high the level of base input signals a, b and c to the PNP transistors 12–14 of FIG. 5. At this time, the period ($t_1$ to $t_2$ in FIG. 7) in which the control input voltage $e_i$ is lower than the reference voltage $V_2$ ($V_2 \leq V_1$) from the reference voltage source 20 is detected by the voltage comparator 19 which causes a braking circuit 50 to produce control signals (a)–(f) of FIG. 7 for the period from $t_1$ to $t_2$. Referring to FIG. 10, the operation of this control circuit will be described.

In FIG. 10, the same reference numerals as those used in FIGS. 1, 5 and 6 denote the parts having that same functions as those shown in FIGS. 1, 5 and 6. The reference numerals 21 and 22 denote reference voltage sources respectively, 23 and 24 denote constant current sources, 26–39 denote transistors, and 40–44 denote resistors. The differential amplifier 8 constituted by the transistors 38 and 39 and the constant current source 23 serves to operate as a control amplifier.

Figure 4:
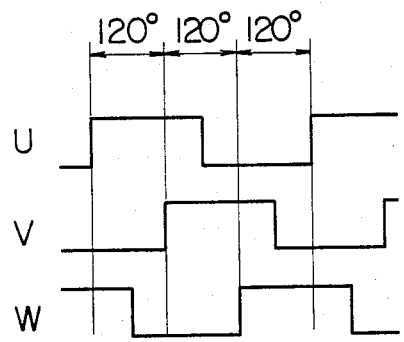
FIG. 4 shows the waveform of three-phase rotation signal.

The input voltage of the terminal 9 is slightly higher than the reference voltage $V_1$ under normal rotating conditions, and the collector current of the transistor 38 is more than that of the transistor 39. A motor current control output is derived from the collector of the transistor 38 to form the current source of a differential switch constituted by the transistors 32–34. The voltage comparator 19 constituted by the transistors 35 and 36 and the constant current course 23 serves to operate as a differential amplifier. Since the reference voltage $V_1$ is set to be below the reference voltage $V_2$, and the input voltage of the terminal 9 is higher than the reference voltage $V_2$ under the normal rotating condition, the transistor 36 turns on and the transistor 35 turns off. At this time, each of the potential of the bases of the transistors 26–28 and 29–31 rises so that these transistors are cut off. Thus, the transistors 15–17 operate under the control of the signals d, e and f inputted to the bases of them, and the transistors 12–14 operate under the control of the signals $\bar{a}$, $\bar{b}$ and $\bar{c}$ inputted to the bases of them so as to flow currents through one of the bases of transistors 12–14 in turn, controlling the amount of the current flowing into the motor driving coils 4. The signals $\bar{a}$, $\bar{b}$ and $\bar{c}$ are obtained by inverting the signals a, b and c in FIG. 4.

The braking of the motor is now described. As described above, when the control input voltage $V_0$ at the terminal 9 is lowered more than the reference voltage $V_1$ as indicated by the downward arrow in FIG. 9, the state of the differential amplifier 8 is reversed and the transistor 38 is cut off, so that the transistors 32–34 are cut off and the transistors 12–14 are cut off. When the control input voltage $V_0$ is further lowered to below the reference voltage $V_2$, the transistor 35 turns on and the state of the differential amplifier 19 is reversed. At the first stage of this behavior, the transistors 29–31, by the lowering of the base potential of them, become conductive to turn all the transistors 12–14 off. Accordingly, the supply of the current to the driving coils 4 is stopped.

After a period of time $\Delta t_1$ as shown in FIG. 7, the conduction state of the transistor 35 becomes deep to cause the transistor 26–28 to be conductive to turn all the transistors 15–17 on. The resistors 40 and 41 are provided to prevent the order of occurrence of the above-mentioned on/off state from being reversed. For example, these resistors may prevent the simultaneous turning-on of the transistors 12 and 15. When the motor is decelerated to the value $S_2$ in FIG. 8, the control input voltage $e_i$ comes back to the value $V_0$, and the transistors 12–14 come back to the normally driven state from their off-state after a period of time $\Delta t_2$ has elasped from the time $t_2$ at which the transistors 15–17 have come back to the normally driven state. The resistors 40 and 41 operate to surely establish the time $\Delta t_2$.

The present invention is advantageous in that it is not required to make greater the capacity of the switching elements at the output stage for the braking function for the brushless DC motor and the braking effect can be obtained without causing any problem of insufficient braking which may occur for example in the opposite phase braking operation performed by applying inverted signals, so that, particularly, the response time for the change-over of motor speed from high to low speed (including a stop) can be reduced. The present invention is advantageous also in that the braking effect can be obtained only by providing the above-mentioned braking period at a part of a range of the variations in control input voltage without a complex control.

Figure 11:
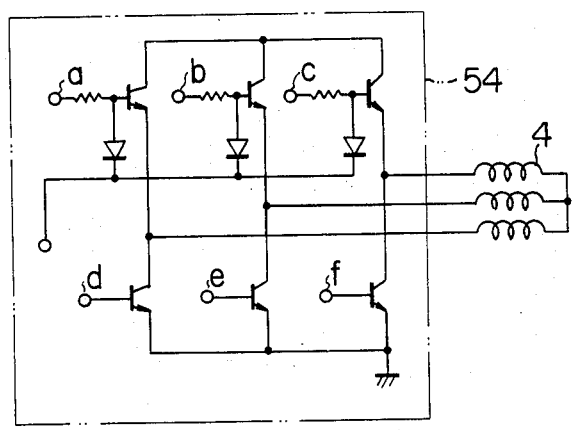
FIG. 11 is a circuit diagram showing another embodiment of the present invention.

Although the switching elements in FIG. 5 operate in the current mode, they may be such transistors which operate in the voltage mode aks shown in FIG. 11 or, alternatively, they may be other switching elements such as thyristors. Further, although a differential amplifier is used for comparing the voltages $V_1$ with $V_2$ in the embodiments described above, it may be replaced by any other comparing means. Further, any characteristic curve other than that shown in FIG. 8 such as abscissa or zero voltage line may be selected.

We claim:

1. A motor driving circuit with a decelerating function comprising:
   a group of motor driving coils;
   position detecting means for detecting the rotational position of a motor;
   signal generating means responsive to an output of said position detecting means for generating a motor driving signal;
   motor driving means for changing over a first and a second group of switching elements provided between said group of motor driving coils and a first electric source potential and between said group of motor driving coils and a second electric source potential, respectively, so as to supply said group of motor driving coils with a current in alternating directions;
   speed control means responsive to a speed setting command for providing a speed control signal; and
   braking control means responsive to said speed control signal for making conductive all the switching elements of selected one of said first and second groups so as to short-circuit said group of motor driving coils.

2. A motor driving circuit according to claim 1, in which said speed control means comprises frequency-to-voltage converting means for obtaining said speed control signal from the frequency of rotation of the motor.

3. A motor driving circuit according to claim 1, in which said speed control signal momentarily changes when said speed setting commands indicate a deceleration and said braking control means is actuated to operate for a period in which said speed control signal is in a predetermined voltage value range.

4. A motor driving circuit according to claim 1, in which said motor driving means includes at least two resistors having resistance values selected so as to make off all the switching elements of the other of said first and second groups prior to the conduction of said selected one of said first and second groups.

5. A motor driving circuit according to claim 1, in which the amount of said current supplied to said motor driving coils is varied in accordance with said speed control signal.

6. A motor driving circuit according to claim 4, in which said two resistors are connected to said first and second groups of switching elements so as to obtain the on/off states of said switching elements.

7. A motor driving circuit according to claim 3, further including first and a second differential amplifiers each having two inputs, one of said two inputs of each of said first and second differential amplifiers receiving said speed control signal, the other inputs of said first and second differential amplifiers being connected to a first and a second reference voltage, said first reference voltage being equal to or larger than said second reference voltage, the outputs of said first and second differential amplifiers being connected to said motor driving means and said braking control means.

8. A motor driving circuit according to claim 1, wherein said first group of switching elements comprises a plurality of first driving transistors and said second group of switching elements comprises a plurality of second driving transistors, said plurality of first and second driving transistors being arranged as a plurality of complementary pairs of first and second driving transistors connected in parallel with said first electric source potential, said group of motor driving coils being a plurality of motor driving coils corresponding in number to the plurality of complementary pairs of first and second driving transistors, a respective one of said motor driving coils having one end connected to a point intermediate an associated one of said complementary pairs of first and second driving transistors and the other end of said plurality of motor driving coils being connected in common.

9. A motor driving circuit according to claim 8, wherein said braking control means includes voltage comparator means responsive to said speed control signal for providing a braking signal, and further comprising a plurality of third transistors corresponding in number to said plurality of complementary pairs of first and second driving transistors, said third transistors having the bases thereof connected with the output of said voltage comparator means, a plurality of fourth transistors corresponding in number to said plurality of complementary pairs of first and second driving transistors, and plurality of fourth transistors having the bases thereof connected via a voltage divider means with the output of said voltage comparator means so that in response to a braking signal from said voltage comparator means, said fourth transistors are rendered conductive at a time later than said third transistors are rendered conductive, said first driving transistors being responsive to the outputs of said third transistors for being rendered non-conductive, and said second driving transistors being rendered conductive in response to the outputs of said fourth transistors so as to enable short-circuiting of said plurality of motor driving coils.

10. A motor driving circuit according to claim 9, wherein the number of said plurality of motor driving coils, complementary pairs of first and second driving transistors, third transistors and fourth transistors is three.

11. A motor driving circuit according to claim 10, wherein the emitters of said first driving transistors are connected to said first electric source potential, the collectors of said first driving transistors being connected to collectors of the associated second driving transistors forming said complementary pairs, the emitters of said second driving transistors being connected to said second electric source potential, said one end of respective ones of said plurality of motor driving coils being connected to said point intermediate the collectors of the associated complementary pairs of first and second driving transistors, said voltage divider means comprising first and second resistors connected in series between said first electric source potential and the output of said voltage comparator means, said third transistors having the emitters thereof connected to said first electric source potential and the collectors thereof connected to the base of said first driving transistors, said fourth transistors having the emitters thereof connected to said first electric source potential and the collectors connected to the bases of said driving transistors, the bases of said fourth transistors being connected to a point intermediate said first and second resistors of said voltage divider means.

12. A motor driving circuit according to claim 1, wherein said motor is a brushless DC motor, and said first and second groups of switching elements comprise semiconductor switching elements for enabling supply of the current to said group of motor driving coils.

* * * * *